United States Patent [19]

Fujishita et al.

[11] Patent Number: 5,503,804
[45] Date of Patent: Apr. 2, 1996

[54] CATALYZER CONTROL APPARATUS

[75] Inventors: Masakatsu Fujishita, Mito; Takeshi Atago, Katsuta; Keiichi Mashino, Katsuta; Suetaro Shibukawa, Katusta; Shigeyuki Yoshihara, Katsuta, all of Japan

[73] Assignees: Hitachi, Ltd., Tokyo; Hitachi Automotive Engineering Co., Ltd., Katsuta, both of Japan

[21] Appl. No.: 838,368

[22] Filed: Feb. 19, 1992

[30] Foreign Application Priority Data

Feb. 20, 1991 [JP] Japan ................... 3-025970

[51] Int. Cl.$^6$ .................... F01N 3/10; F01N 3/18
[52] U.S. Cl. .................... 422/109; 60/284; 60/286; 60/300; 422/174
[58] Field of Search .................... 422/109, 173, 422/174, 199; 60/286, 284, 300; 322/29, 32; 320/41, 42

[56] References Cited

U.S. PATENT DOCUMENTS

| | | | |
|---|---|---|---|
| 3,768,982 | 10/1973 | Kitzner et al. | 422/180 X |
| 3,816,805 | 6/1974 | Terry | 320/15 |
| 3,886,739 | 6/1975 | Lee | 60/286 |
| 3,889,464 | 6/1975 | Gardner | 60/286 |
| 4,045,718 | 8/1977 | Gray | 320/17 |
| 4,102,127 | 7/1978 | Saiki et al. | 60/284 |
| 4,651,081 | 3/1987 | Nishimura et al. | 322/29 X |
| 5,146,743 | 9/1992 | Maus et al. | 423/212 X |
| 5,155,995 | 10/1992 | Kinnear et al. | 60/284 X |
| 5,163,290 | 11/1992 | Kinnear | 60/284 X |
| 5,184,463 | 2/1993 | Becker et al. | 60/284 |
| 5,191,763 | 5/1993 | Yuuki | 60/284 |
| 5,194,229 | 3/1993 | Abe et al. | 422/173 X |
| 5,201,802 | 4/1993 | Hirota et al. | 60/300 X |
| 5,204,066 | 4/1993 | Fumio et al. | 422/173 X |
| 5,216,880 | 6/1993 | Aoki et al. | 60/300 X |
| 5,229,080 | 7/1993 | Abe et al. | 422/177 X |

FOREIGN PATENT DOCUMENTS

| | | |
|---|---|---|
| 2352087 | 11/1974 | Germany. |
| 2333092 | 1/1975 | Germany. |
| 3939068 | 5/1991 | Germany. |
| 8910471 | 2/1989 | WIPO. |

OTHER PUBLICATIONS

SAE Technical Paper 90053, "Recent Developments in Electrically Heated Metal Monoliths", by W. A. Whittenberger & J. Kubsh, pp. 230–239, 1990.
Patent Abstracts of Japan, vol. 3, No. 144 (M–82) 28 Nov. 1979 & JP-A-54 121 324 (Toyota) 20 Sep. 1979.

*Primary Examiner*—Timothy M. McMahon
*Assistant Examiner*—Robert Carpenter
*Attorney, Agent, or Firm*—Ladas & Parry

[57] ABSTRACT

A catalyzer control apparatus for purifying exhaust gas from an internal combustion engine has an electrically heated catalyzer that is heated by a battery which battery is isolated from the conventionally provided engine battery. The temperature of the catalyzer is detected by a sensor and a control circuit located with an engine control unit selectively applies power to heat the catalyzer. The catalyzer is arranged to be pre-heated prior to engine start and by isolating the battery for heating the catalyzer from the normally provided engine battery so, because the catalyzer takes a great power, engine starting is enhanced by virtue of having separate batteries.

7 Claims, 4 Drawing Sheets

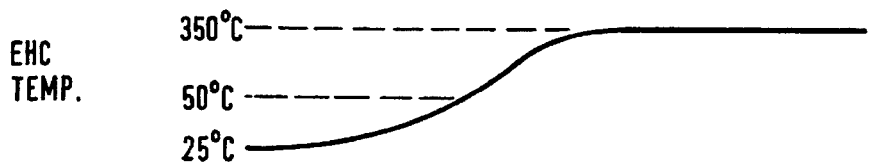
Fig.4(a) EHC TEMP.
Fig.4(b) IGN. SW
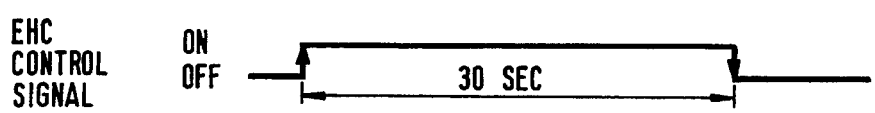
Fig.4(c) EHC CONTROL SIGNAL
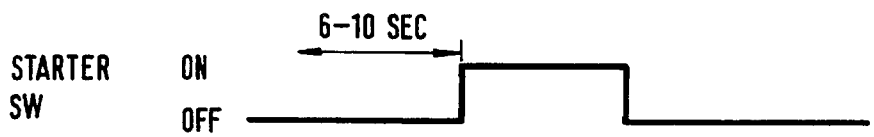
Fig.4(d) STARTER SW
Fig.4(e) ALTERNATOR RPM
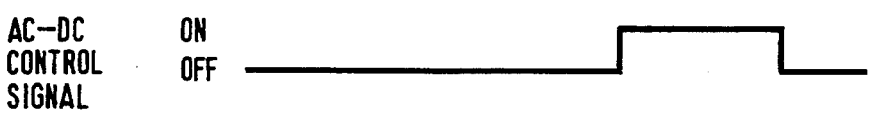
Fig.4(f) AC—DC CONTROL SIGNAL
Fig.4(g) 24V BATTERY VOLTAGE

CATALYZER CONTROL APPARATUS

BACKGROUND OF THE INVENTION

1. Field of the Invention

This invention relates to a catalyzer apparatus for purifying emission gas of an automobile engine.

2. Description of the Related Art

A known catalyzer control apparatus, as disclosed in SAE, Technical Paper, Series 900503 (1990), pages 61 to 70 for purifying exhaust gas from an internal combustion engine has a converter with a resistor-type metal substrate which is heated to improve cold start emission characteristics. Such electrically heated monoliths have been designed to reach catalytic working temperatures of about 350° C. in less than thirty seconds using the conventional 12 V electrical system. Thus, means are provided for applying a heating current to the catalyzer and temperature detection means are provided for detecting the temperature of the catalyzer so as to control the heat applying means so that the temperature of the catalyzer is raised toward a desired working temperature.

Because the amount of energy required to heat the catalyzer is approximately 4.7 Kw, a considerable strain is placed upon the conventional battery, resulting in battery drain. Because it is desired to heat the catalyzer prior to starting the engine so that it is closer to its working temperature at the time of engine start to thereby minimize pollution, so the drain on the battery in heating the catalyzer often results in the battery charging capacity dropping so that the engine cannot be started by its normally provided starter motor.

This invention seeks to overcome the foregoing difficulty.

A primary object of this invention is to ensure the startup of an engine by isolating the power supply for supplying current to the catalyzer from that for starting the engine.

A second object of this invention is to raise power transmission efficiency by providing the said isolated power supply with a higher voltage than that of the power supply for starting the engine, thereby providing an inexpensive, lightweight control apparatus.

SUMMARY OF THE INVENTION

According to this invention there is provided a catalyzer control apparatus for purifying exhaust gas from an internal combustion engine having a power supply comprises catalyzer means, heat applying means for applying a heating current to said catalyzer means, and temperature detection means for detecting the temperature of the said catalyzer means, said heat applying means including control means for controlling the heating current to be supplied to the said catalyzer means so as to raise the temperature of the said catalyzer means toward a desired temperature using the signals from the said temperature detection means, a further power supply being provided for supplying current to the said catalyzer means, which further power supply is independent of the power supply provided for the engine.

Preferably, the further power supply for supplying current to said catalyzer means is set to a voltage higher than the power supply provided for the engine.

Advantageously, said control means includes means for activating said heat applying means before engine startup, and preferably, said desired temperature is 350° C.

Conveniently, said control means is activated by the engine ignition switch and includes a control circuit means connected to the temperature detection means, said control circuit means including comparison means for comparing the temperature sensed by said temperature detection means with a predetermined temperature and, in dependence upon said comparison, said comparator means controls a switching device for controlling supply of the heating current to said catalyzer means.

In a currently preferred embodiment an ac/dc converter is provided for charging said further power supply, and advantageously, an alternator is provided for charging said further power supply.

Advantageously, said control circuit means further includes judgment means for judging when the engine has started and to then connect said ac/dc converter to charge said further power supply.

Preferably, said control circuit means also include further power supply voltage level judgment means adapted to switch OFF said switching device and connect said ac/dc converter to charge said further power supply if said voltage level is less than a predetermined level, and to switch ON said switching device and disconnect said ac/dc converter from charging said further power supply if said voltage level is equal to or greater than said predetermined level.

In an embodiment of the invention, said catalyzer means comprises a main catalyzer and a pre-catalyzer located upstream of exhaust gas flow from said main catalyzer, said pre-catalyzer having a resistive element to which said heating current may be applied.

Conveniently, said control means is integrated with an engine control unit.

The catalyzer control apparatus of this invention is able to ensure power for engine starting and raise the efficiency of purifying unburnt gas and to reduce the amount of HC and CO emissions contained in unburnt gas just after engine start because the apparatus detects the temperature of the catalyzer prior to engine start and heats the catalyzer by applying current to the catalyzer by a control means. Additionally, because this invention isolates the power source supplying current to the catalyzer from the power supply for starting the engine and because, preferably, the voltage of the power supply for heating the catalyzer is set to be higher than that of the power supply for starting the engine, so reduction of wire weight and control unit size and improvement of power transmission efficiency can be achieved.

BRIEF DESCRIPTION OF THE DRAWINGS

The invention will now be described, by way of example, with reference to the accompanying drawings in which:

FIGS. 4(a)–4(g) show timing diagrams of the operation of the control apparatus.

In the Figures, like reference numerals denote like parts.

DESCRIPTION OF THE PREFERRED EMBODIMENTS

Figure 1:
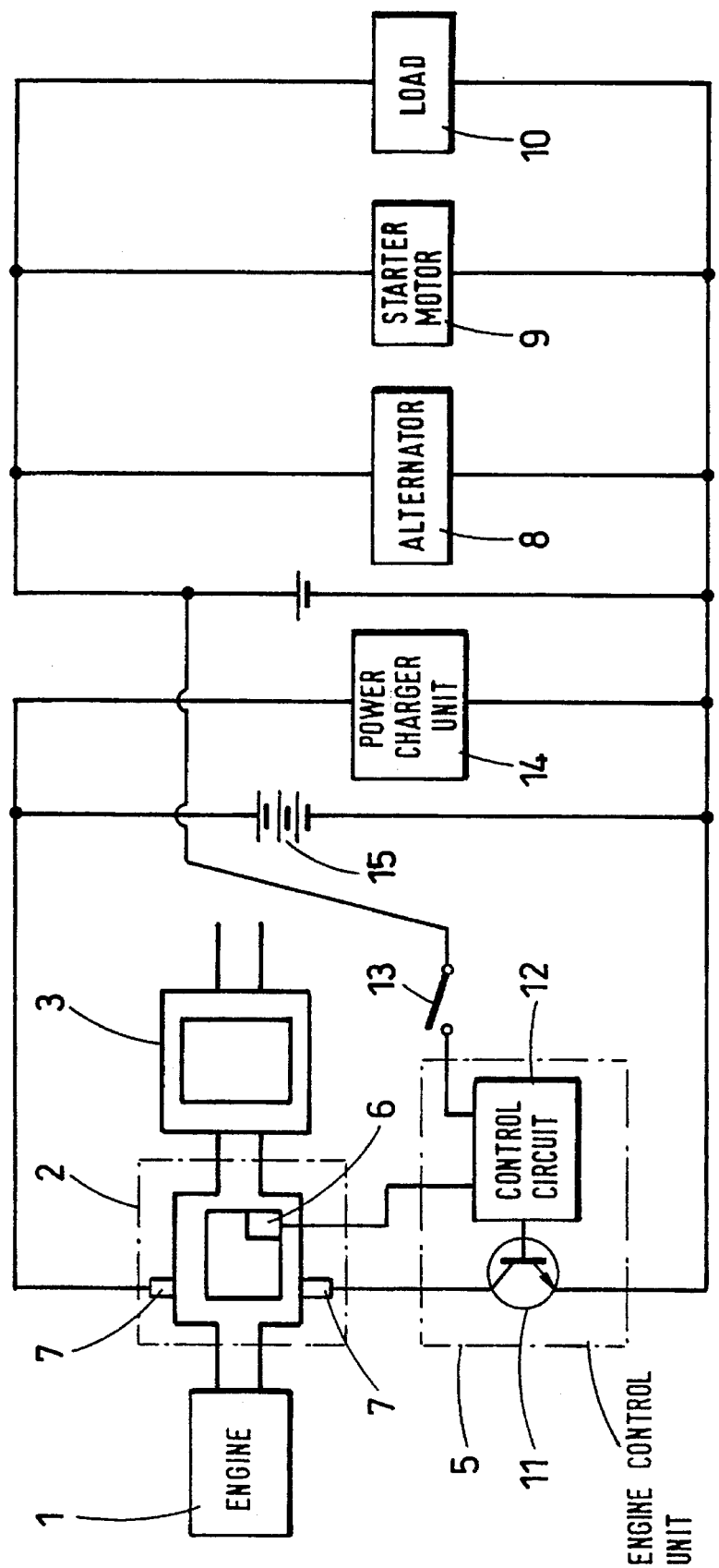
FIG. 1 shows a simplified block schematic diagram of the overall configuration of a first embodiment of the catalyzer control apparatus in accordance with this invention.

The catalyzer control apparatus shown will now be described with reference to FIG. 1.

An internal combustion engine 1 exhausts unburnt gas through a pre-catalyzer 2 followed by a main catalyzer 3, the catalyzer 3 having a larger capacity than the pre-catalyzer 2, and the gases are then discharged outside from the catalyzer 3. The pre-catalyzer 2 is an electrically heated catalyzer (EHC) known per se having with a temperature sensor 6 to detect a temperature thereof and two terminals 7 to supply current to the pre-catalyzer. Although in the preferred embodiment the EHC is formed by a pre-catalyzer, it is to be understood that the invention is not limited to such a construction and a single catalyzer which is electrically heated could alternatively be used. One of the terminals 7 is connected to a battery 4 and the other terminal 7 is connected to the collector of a N-P-N transistor 11 of an engine control unit (ECU) 5. The ECU 5 includes a transistor 11 providing an EHC control signal switching a relay means (not shown in FIG. 1) to thereby switch ON/OFF current flowing to the pre-catalyzer 2, and a control circuit 12 which receives signals from the temperature sensor 6. Consequently, the control circuit 12 generates a signal to duty-drive the base of the transistor 11. The emitter of the transistor 11 is connected to the negative terminal of each of a pair of batteries 4, 15. The battery 4 is the conventionally provided 12 V battery connected to an alternator 8, a starter motor 9 and an electric load 10. An ignition switch 13 is connected between the control circuit 12 and the battery 4.

Figure 2:
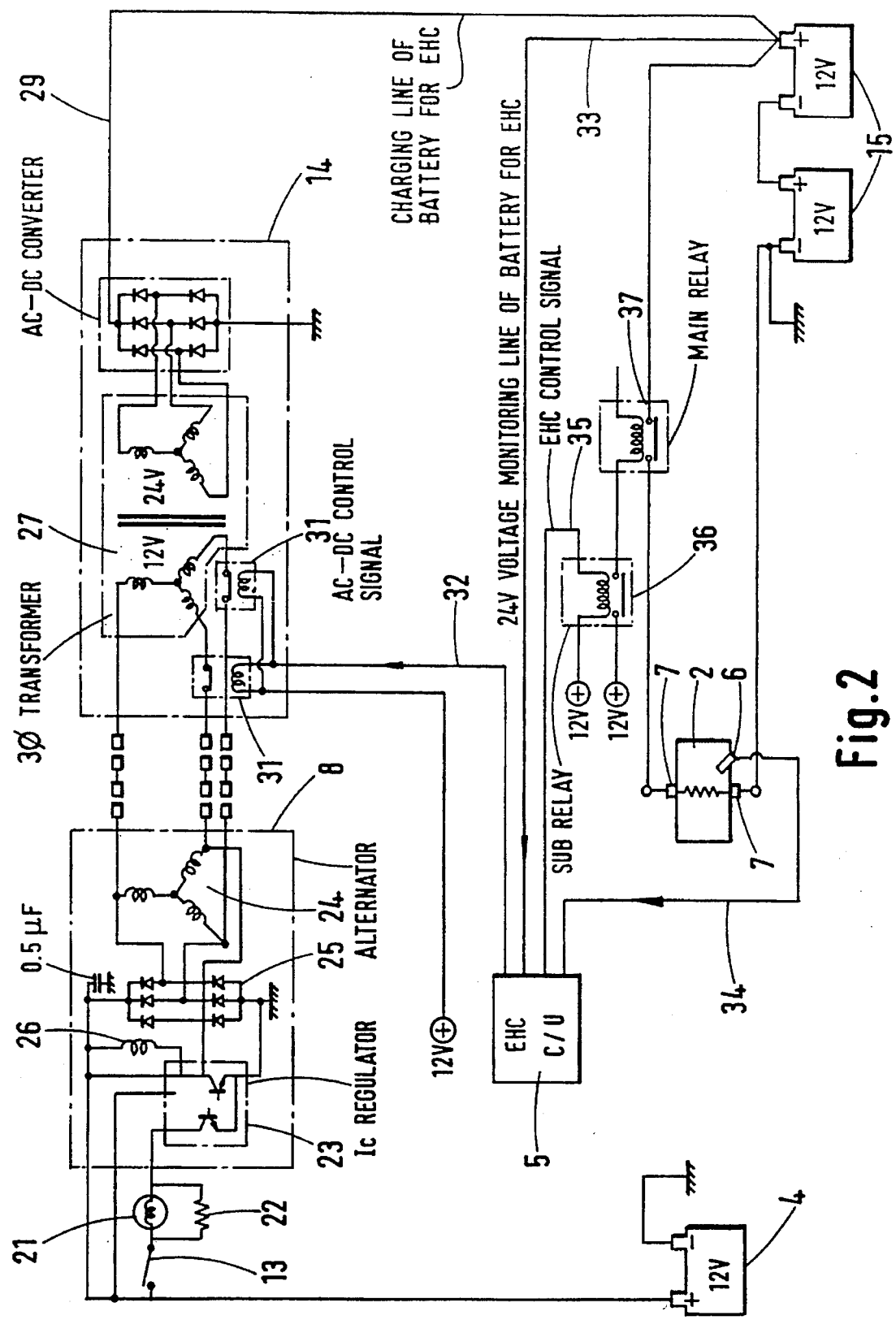
FIG. 2 shows in block schematic form a currently preferred form of battery charging circuit and heating circuit for the first embodiment.

In accordance with this invention, a further battery 15, preferably of greater voltage than battery 4, for example 24 V, is provided which has its own power charger unit 14 which may be another alternator or a three-phase step up transformer and ac/dc converter, as shown in FIG. 2. The battery 15 is separate from and isolated, except through the ground potential circuit, from the battery 4.

In operation, when the key switch 13 is turned on, the ECU 5, which is preferably constituted by, for example, a microcomputer, performs feedback control with a previously set temperature value set in ROM (approximately 350° C.) as a desired value and a signal from the temperature sensor 6 being a sensed temperature. Thus, the control circuit 12 controls the duty of the base of the transistor 11 so as to bring the temperature of the pre-catalyzer 2 close to the desired value. Then, when the pre-catalyzer reaches 350° C., the transistor 11 is cut OFF to stop current heating the pre-catalyzer.

Following the ON duty of the transistor 11, current flows from the battery 15, pre-catalyzer 2 and transistor 11 and generates heat due to electric resistance of the pre-catalyzer 2. Thus, if the engine is started by the battery 4, alternator 8 and starter motor 9, after the heating of catalyzer is completed, a large amount of harmful components such as HC and CO contained in unburnt gas can be removed, because the efficiency of purifying the unburnt gas of catalyzer has been raised sufficiently. In addition, if the charge capacity of the second battery 15 drops due to the heating of the pre-catalyzer 2, the difficulty of starting the engine can be prevented because the battery 4 for driving the starter which is necessary for starting the engine is isolated from the battery 15 for heating catalyzer.

A currently preferred form of the battery charging circuit and heating circuit for the first embodiment will now be described with reference to FIG. 2.

In FIG. 2 the ignition switch 13 is connected in series with an ignition warning light 21 which is connected in parallel with a ballast resistor 22. The warning light 21 is connected to an IC regulator 23 of the alternator 8. The alternator has stator windings connected in star for producing a three-phase output. The three-phase output of the stator 24 is rectified by a full wave rectifier diode stack 25 for producing the normally provided 12 V for the load 10 and for charging the battery 4. A usually provided induction coil 26 is provided between a positive side of the battery 4 and the regulator 23, the regulator 23 preferably being an integrated circuit of known configuration. With this invention, the stator windings produce a three-phase output which is connected to the power charger unit 14 which, in the embodiment of FIG. 2, comprises a three-phase step-up transformer 27 stepping up from 12 V to 24 V to provide output to an ac/dc converter 28.

As shown in FIG. 2, the battery 15 is formed by two serially connected 12V batteries to provide a 24 V supply to the EHC 2 and the batteries are charged by a connection 29 from the ac/dc converter 28. The connection between two of the phases of the stator 28 and the primary of the three-phase transformer 27 are connected via relays 31 which are controlled over line 32 by the ECU 5 so that the charging circuit for the 24 V battery 15 may be selectively turned ON/OFF. The voltage of the battery 15 is monitored over line 33 by the ECU 5 and the output of the temperature sensor 6 is also monitored by the ECU 5 over line 34. The ECU 5 provides an EHC control signal over line 35 to a subrelay 36 arranged to selectively apply a switching signal to a main relay 37. The main relay 37 is arranged to switch a current of about 250 amps from battery 15 to the EHC 2, two relays 36, 37 are required due to the high switched current.

Figure 3:
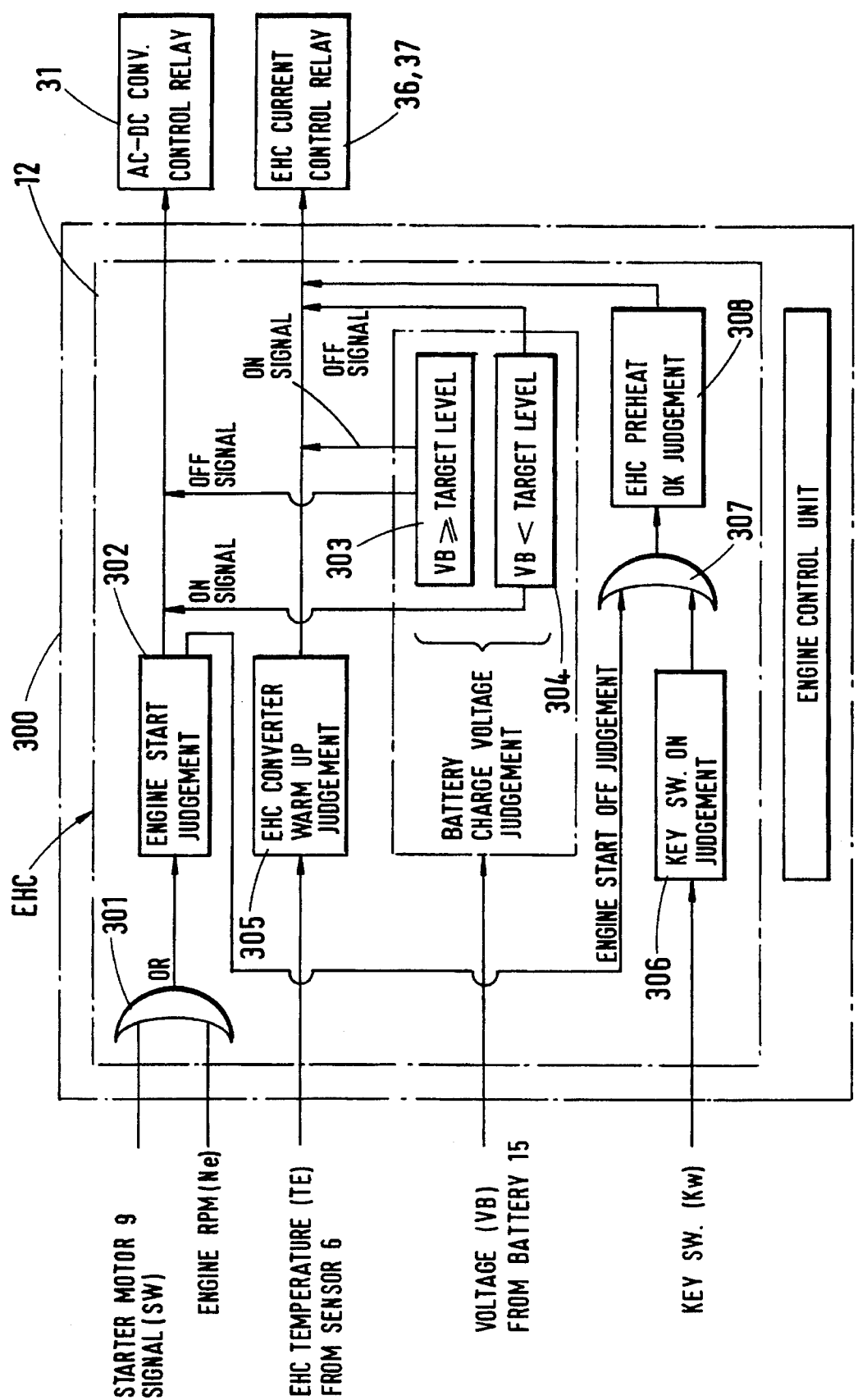
FIG. 3 shows a control state flow diagram.

As shown in FIG. 1, the control circuit 12 for the EHC is, preferably, integrated with the engine control unit 5, although as shown in FIG. 3, the control circuit 12 may be separate from the control unit 5 and simply located within a control unit 300. Referring to FIG. 3, the control circuit 12 has an OR gate 301 for receiving inputs from the starter motor 9 and from an engine rotation speed sensor deriving engine r.p.m. ($N_e$). The OR gate 301 provides an output in dependence upon the condition of the starter motor or the engine r.p.m. reaching a predetermined speed to element 302 determining whether the engine has started or not. A signal from element 302, in dependence whether the engine has started or not, is transmitted over line 32 to control the operative states of relays 31, the control signal being also dependent upon the output state of elements 303, 304 judging the battery 15 charge voltage. Thus, if the charge voltage of battery 15 is less than a predetermined target value is determined by element 304 and if the voltage of battery 15 is equal to or greater than the predetermined target level is determined by element 303.

The temperature sensed by sensor 6 is input to a temperature judgment level element 305, and if the level is below a predetermined target level, so an output is provided to the relay 36, 37 over the EHC control signal line 35, but this output is also dependent upon the outputs from the elements 303, 304.

The ignition switch 13, as is conventional, has at least three positions, namely power OFF where the battery 4 is disconnected from all electrical elements, a next position which is power ON, i.e. key switch ON and a further, subsequent, position of engine start where power is provided to the induction coil 26 to turn the starter motor 9.

When the ignition switch is in the power ON position, i.e. normally its first position after OFF, this condition is judged by element 306 and if an ON condition is detected, so an output is provided to AND gate 307 which is also connected to receive an output from element 302 indicative of an engine OFF, i.e. non-start judgmental signal being produced from element 302. When these two signals are derived, so gate 307 provides an output to the EHC pre-heat judgmental element 308 for providing an output to the ac control relay 36, 37.

Thus, if element 302 determines that the engine has started but the element 303 determines that the battery 15 V is equal to or above the predetermined target value, so the relays 31 are open-circuited to cut off the charging line to battery 15 and to switch ON the EHC control signal to short-circuit the relays 36, 37 so that power is provided from the battery 15 to the EHC 2. If the voltage of battery 15 is below the predetermined target voltage and the engine is determined to have started, then the element 304 provides an ON signal to close the contacts of relays 31 so as to charge the battery 15 over line 29 from the ac/dc converter 28 and the element 304 provides an OFF signal for the EHC control signal to open-circuit the relays 36, 37, relay 36 controlling the operation of relay 37. By the expedient of elements 303, 304 so the power to heat the pre-catalyzer 2 is only operated if the battery has a sufficient voltage and power is saved by not operating the ac/dc converter 28 and vice versa if the battery 15 power is too low so the battery is charged and power from the battery 15 to the pre-catalyzer 2 is cut off.

Because it is desired that the catalyzer 2 be pre-heated before the engine is started, so the condition of engine OFF is detected and input to AND gate 307, and provided that the ignition key switch is in the power ON position, so a signal from element 308 is nominally transmitted to close the relays 36, 37, but such signal is dependent upon the judgment of elements 303, 304.

Referring now to the timing diagrams 4(a)–4(g), the EHC 2 temperature is normally at ambient temperature, say 25° C., and the best operating performance of the EHC catalyzer is produced at 350° C., as shown in FIG. 4(a). When the ignition key switch 13 is switched to its first position, i.e. power ON, as shown in FIG. 4(b), so the engine is still OFF, but an output is made from element 308 to switch the EHC control signal on line 35 ON. The following will disregard the voltage of battery 15 which is determined by the elements 303, 304 to override the following steps of operation if necessary.

Upon switching ON the EHC control signal (as shown in FIG. 4(c)), the battery 15 supplies power to heat the pre-catalyzer 2 and when the pre-catalyzer has reached a temperature of about 50° C. (in a period of time, approximately 6–10 seconds), so the ignition key switch is permitted to provide a signal to engage the starter motor 9 (as shown in FIG. 4(d)). With the start of the starter motor, the engine is turned over and, as a consequence, the alternator 8 also starts to rotate. While the starter motor is engaged, and whilst the engine is starting, the alternator r.p.m. slowly increases until the engine is started and the starter motor is disengaged. With the starter motor switching from an ON to an OFF condition (or the engine r.p.m. detected by a sensor (not shown) reaching a predetermined value) so the ac/dc control signal on line 32 is switched from OFF to ON (as shown in FIG. 4(f)) from the element 302, and in dependence upon the output signals from elements 303, 304, so the signal may be used to control the states of relays 31. If the voltage of battery 15 is low, below the predetermined target level, then the relays 31 are closed and the charging unit formed by the three-phase transformer 27 and ac/dc converter 28 supplies a charging signal over line 29 to charge the 24 V battery 15 (as shown in FIG. 4(g)).

Although the power charger unit 14 has been described as being a three-phase transformer 27 in combination with an ac/dc converter 28, the power charger unit 14 could be another alternator or a second output from a twin rotor and twin stator alternator, known per se.

By virtue of the present invention, if the charge capacity of the second battery 15 drops due to the heating of the pre-catalyzer 2, which it should be remembered takes about 4.7 kw, the difficulty of starting the engine can be prevented because the battery 4 for driving the engine starter is isolated from the battery 15 for heating the catalyzer and is not drained thereby. In addition, because the electric power necessary for heating the pre-catalyzer 2 is the product of voltage and current, it is possible to decrease the current to be fed to the catalyzer in proportion to the higher voltage of the second battery 15, so that reduction of connecting wire weight, reduction of control unit size corresponding to the miniaturization of the transistor 11 and improvement of power transmission efficiency can be achieved.

It is to be understood that the invention has been described with reference to exemplary embodiments, and modifications may be made without departing from the spirit and scope of the invention as defined in the appended claims.

We claim:

1. A catalyzer control apparatus for purifying exhaust gas from an internal combustion engine having a power supply comprising;

catalyzer means having an electrically heated catalyzer, heat applying means for applying a heating current to activate said electrically heated catalyzer, said heat applying means including a further power supply for supplying current to said electrically heated catalyzer, which further power supply is independent of a power supply provided for the internal combustion engine, temperature detection means for detecting the temperature of said electrically heated catalyzer, said heat applying means including control means for controlling the heating current to be supplied to said electrically heated catalyzer so as to raise the temperature of said electrically heated catalyzer toward a desired temperature using the signals from said temperature detection means, said control means being activated by an engine ignition switch, an alternator for charging both of said power supply and said further power supply, engine start judging means for judging starting of the internal combustion engine in response to one of a signal from an engine starter motor and a means for producing an engine revolution speed signal, and a power charging unit, electrically connected to said alternator and to said further power supply, for charging only said further power supply after engine starting is judged by said engine start judging means, said power charging unit including a transformer for raising an output voltage from said alternator to a higher voltage than a voltage of said power supply, and an ac/dc converter for effecting ac/dc conversion of said raised output voltage, said control means including:

(a) a control circuit means connected to the temperature detection means, said control circuit means including comparison means for comparing the temperature sensed by said temperature detection means with a predetermined temperature and, in dependence upon a result of comparison by said comparison means, said comparator means controlling a switching device for controlling supply of the heating current to said electrically heated catalyzer, (b) power supply voltage level judgment means for switching OFF said switching device and for connecting said ac/dc converter to charge said further power supply if a voltage level thereof is less than a predetermined level, and for switching ON said switching device and for disconnecting said ac/dc converter from charging said further power supply if said voltage level is equal to or greater than the predetermined level.

2. A catalyzer control apparatus as claimed in claim 1 wherein a voltage of said further power supply for supplying current to said electrically heated catalyzer is raised to 24 V by said transformer while a voltage of said power supply provided for the engine is 12 V.

3. A catalyzer control apparatus as claimed in claim 1, wherein said control means incudes means for activating said heat applying means, said activating means including ignition switch means electrically incorporated therein connected so as to start the supply of current from said further power supply to said electrically heated catalyzer upon turning on of said ignition switch.

4. A catalyzer control apparatus as claimed in claim 1 wherein said desired temperature is 350° C.

5. A catalyzer control apparatus as claimed in claim 1, wherein said catalyzer means comprises, in addition to said electrically heated catalyzer as a pre-catalyzer, a main catalyzer having an input side and an output side, said input side of said main catalyzer being fluidly connected to said electrically heated catalyzer.

6. A catalyzer control apparatus as claimed in claim 1 wherein said control means is integrated with an engine control unit.

7. A catalyzer control apparatus for purifying exhaust gas from an internal combustion engine having a power supply comprising:

an electrically heated catalyzer, heat applying means for applying a heating current to said electrically heated catalyzer, temperature detection means for detecting the temperature of said electrically heated catalyzer, said heat applying means including control means for controlling the heating current to be supplied to said electrically heated catalyzer so as to raise the temperature of said electrically heated catalyzer toward a desired temperature using the signals from said temperature detection means, and a further power supply for supplying current to said electrically heated catalyzer, which further power supply is independent of a power supply provided for an internal combustion engine and has a higher voltage than a voltage of the power supply for the engine, said control means including ignition switch means arranged for initiating supply of heating current from said further power supply to said electrically heated catalyzer upon turning ON of said ignition switch means and at a time prior to the internal combustion engine firing, an alternator for charging both of said power supply and said further power supply, engine start judging means for judging starting of the internal combustion engine in response to one of a signal from an engine starter motor and a means for producing an engine revolution speed signal, and a power charging unit, electrically connected to said alternator and to said further power supply, for charging only said further power supply only after the internal combustion engine is started and only after said electrically heated catalyzer is heated to substantially an operation temperature, said power charging unit including a transformer for raising an output voltage from said alternator to a higher voltage than a voltage of said power supply, and an ac/dc converter for effecting ac/dc conversion of said raised output voltage.

* * * * *